UNITED STATES PATENT OFFICE.

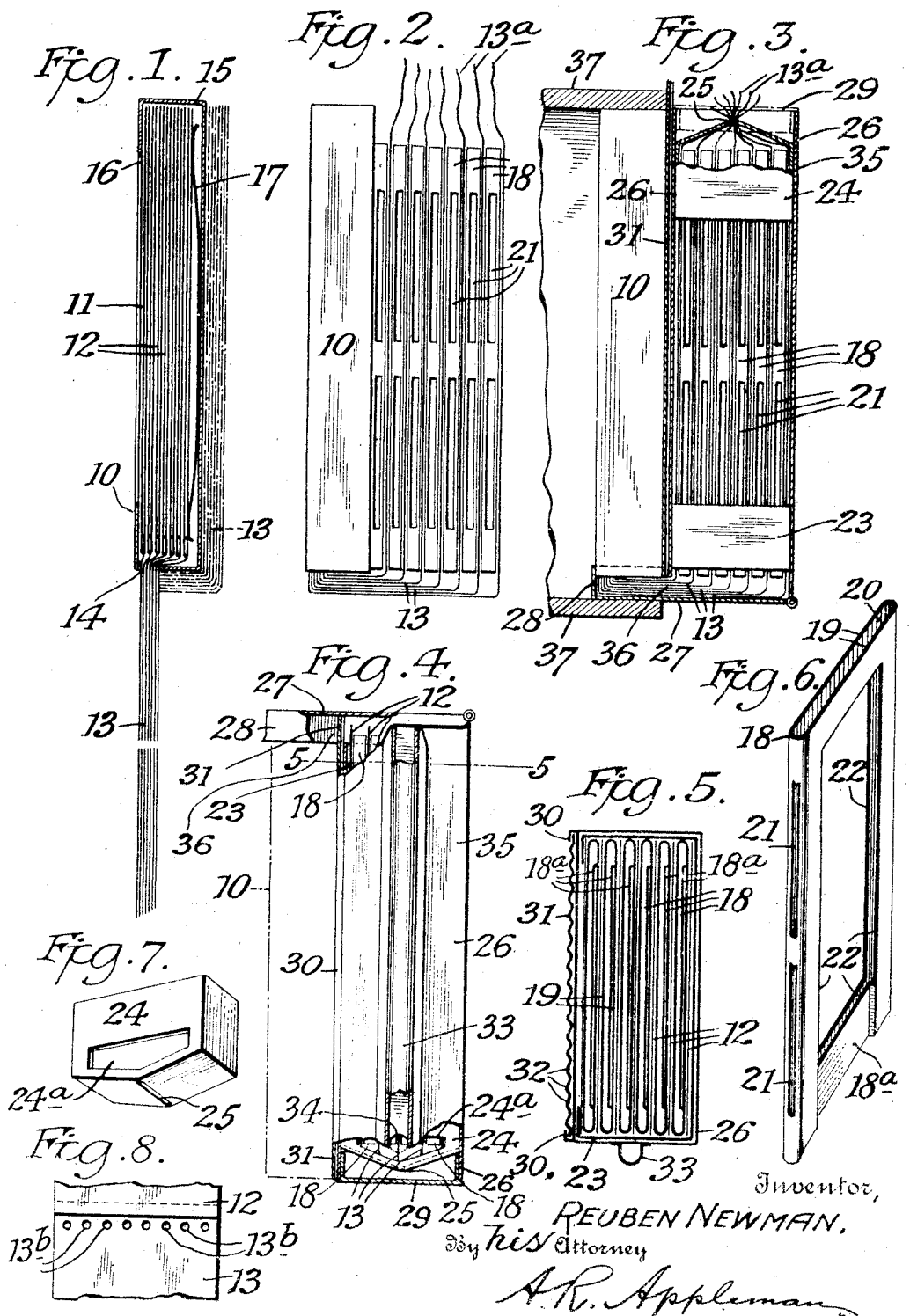

REUBEN NEWMAN, OF NEW YORK, N. Y.

MEANS FOR DEVELOPING FILMS.

1,256,247. Specification of Letters Patent. Patented Feb. 12, 1918.

Application filed October 12, 1916. Serial No. 125,131.

*To all whom it may concern:*

Be it known that I, REUBEN NEWMAN, a citizen of the United States, residing at New York, county and State of New York, have invented a new and useful Improvement in Means for Developing Films, of which the following is a specification.

My invention relates to means for developing films, the object being to provide a suitable developing tank arranged at the back of a camera and into which the films, as they are successively exposed are drawn, means being provided for holding the said films in spaced relation to prevent contact, one with the other.

A further object being to provide means whereby pack films may be expeditiously and conveniently developed in the open light thus dispensing with the use of a dark room for the purpose.

To these ends, and to such others as the invention may pertain, the same consists, further, in a novel construction, combination, and adaptation of the parts, as will be hereinafter more fully described.

I clearly illustrate my invention in the accompanying drawings, which form a part of this specification, and in which drawings similar reference characters are employed to designate corresponding parts throughout the several views, in which:—

Figure 1, is a sectional elevation of a film pack designed for use in connection with a developing tank constructed according to my invention.

Fig. 2, is a side elevation showing the film pack and the disposition of spacers or frames employed in carrying out my invention.

Fig. 3 is a partial sectional elevation showing a portion of a camera, a film pack and my improved developing tank assembled and in operative position.

Fig. 4 is a side elevation, partly broken away of the developing tank detached from the camera and in position to be filled with developing fluid.

Fig. 5 is a diagrammatic horizontal section taken on the line 5—5 of Fig. 4.

Fig. 6 is a perspective view of one of a plurality of spacers or frames arranged in the developing tank.

Fig. 7 is a detail perspective view of a cap constituting one of the structural elements.

Fig. 8 is a face view of portions of a film and a tongue secured one to the other.

In the drawings I show at 10 a film pack comprising the usual safety cover 11, and a plurality of films 12, having the usual tongues or extensions 13, which are provided close to the films each with a line of apertures $13^b$ and in the form of construction shown, said tongues are passed outwardly through a suitable, light tight opening 14, at the bottom of the pack and folded against the end and back of the pack to provide a compact commercial package, as indicated in dot and dash lines in Fig. 1, of the drawings, but which, when the films are to be exposed and developed, are folded downwardly as shown in full lines in Fig. 1, for a purpose hereinafter pointed out.

The films are housed in a suitable casing 15, having the usual exposure opening 16, and are backed up by the usual spring 17, as shown.

In assembling the elements constituting my invention, I first take a plurality of spacers or frames 18, and arrange them at the back of the film pack 10, as shown in Fig. 2, of the drawings, with the tongues or extensions 13, held in spaced relation therebetween. The spacers or frames 18, are constructed of sheet metal, preferably chemical proof, and are of open or skeleton formation, as clearly shown in Fig. 6, having spaced sides 19, open ends, 20, apertures 21, in the edges and openings 22 in the sides, to permit the developing fluid to flow freely through the tank and contact with the films.

In going further with the assembling operation the inner spacer or frame 18, or that one next to the film pack, is removed and a split sleeve or open band 23, is placed over the frames 18 and tongues 13. and passed downwardly nearly to the bottom as shown in Fig. 3, the top portions of the spacers or frames being confined by a cap 24, having a side opening or openings $24^a$ and a light tight slot 25, through which the free ends $13^a$ of the tongues 13, are passed and held in position to be grasped by the fingers when it is desired to draw an exposed film from the pack into the developing tank, which I will now describe.

In further assembling the parts a casing or housing 26, is passed on over the cap 24, and sleeve 23, and as shown in Fig. 3, is provided with a hinged lower end 27, having a flange 28, to exclude light, said casing being normally open at the top to permit of easy access to the tongue ends 13ª, this open top being closed by a water tight cap 29, after all the films have been exposed and drawn into the tank and the tongues 13, torn off at the slot 25.

The casing 26 is further provided with guides 30, adapted to receive a slide 31, having corrugations 32, and with a spout 33, having communication with the interior of the casing 26, through an aperture 34, and when it is desired to develop the films confined in the developing tank 35, which is constituted by the casing 26 and its associated parts, the slide 31, is first pushed downwardly to exclude light at the passage 36, through which the films were previously drawn; the cap 29 is then put in place after which the tank is removed from the camera 37, and inverted as shown in Fig. 4. The developing fluid may now be poured into the spout 33, and enters through the aperture 34, and flows freely through the opening 24ª, in the cap 24, and through the apertures 13ᵇ in the tongues, rising evenly in the tank, resulting in a uniform satisfactory development of the films as will be readily understood, the air in the tank passing outwardly along or through the corrugations as will be also readily understood.

Any suitable fastening devices may be employed to attach the tank to the camera and to hold the structural elements in assembled relation, but as such devices form no part of my invention they are not shown.

It is thought that the operation and utility of the device will be apparent without further description, and while in the drawings there is illustrated a preferred embodiment of the invention, it is to be understood that the construction thereof is susceptible to such variations and modifications as fall within the scope of the following claims.

The spacers are each preferably provided at that end which the films enter or are drawn, with a depression 18ª as shown to eliminate the possibility of scratching or otherwise injuring the film faces as they are drawn into the tank.

What I claim and desire to secure by Letters Patent is:—

1. In a device of the class specified, a tank having a passage to receive the film tongues and through which the films are drawn, a plurality of skeleton frames to hold the exposed films in spaced relation; a corrugated slide adapted to close said passage and a light excluding spout communicating with the interior of the tank for the purpose described.

2. A developing tank of the class specified comprising a casing having a hinged closure at one end and a watertight cap at the other, a corrugated slide carried at one side, a light excluding spout communicating with the interior of the tank and a plurality of spacers within the tank for the purpose specified.

3. In a device of the class specified, a tank having a film passage at one side, a plurality of spacers in said tank, and a corrugated slide mounted to close said passage for the purpose described.

In testimony whereof, I have signed my name to this specification, this ninth day of October, 1916.

REUBEN NEWMAN.

Witness:
ISIDOR D. BROKAW.

Copies of this patent may be obtained for five cents each, by addressing the "Commissioner of Patents, Washington, D. C."